United States Patent
Zander et al.

(10) Patent No.: US 10,994,663 B2
(45) Date of Patent: May 4, 2021

(54) CLAMPING JAW FOR A SUPPORT ASSEMBLY FOR A BICYCLE CARRIER

(71) Applicant: Thule Sweden AB, Hillerstorp (SE)

(72) Inventors: Patrik Zander, Jönköping (SE); Anders Sjödell, Värnamo (SE)

(73) Assignee: Thule Sweden AB, Hillerstorp (SE)

( * ) Notice: Subject to any disclaimer, the term of this patent is extended or adjusted under 35 U.S.C. 154(b) by 0 days.

(21) Appl. No.: 16/179,253

(22) Filed: Nov. 2, 2018

(65) Prior Publication Data
US 2019/0071023 A1    Mar. 7, 2019

Related U.S. Application Data

(63) Continuation of application No. 14/915,173, filed as application No. PCT/EP2014/061487 on Jun. 3, 2014, now Pat. No. 10,144,359.

(30) Foreign Application Priority Data

Aug. 27, 2013 (EP) .................................... 13181828

(51) Int. Cl.
| | |
|---|---|
| *B60R 9/048* | (2006.01) |
| *B60R 9/10* | (2006.01) |
| *F16B 2/10* | (2006.01) |
| *F16B 31/02* | (2006.01) |
| *F16B 2/02* | (2006.01) |

(52) U.S. Cl.
CPC .............. *B60R 9/048* (2013.01); *B60R 9/10* (2013.01); *F16B 2/02* (2013.01); *F16B 2/10* (2013.01); *F16B 31/027* (2013.01)

(58) Field of Classification Search
CPC ... B60R 9/048; B60R 9/10; B60R 9/00; F16B 2/02; F16B 2/10
See application file for complete search history.

(56) References Cited

U.S. PATENT DOCUMENTS

| | | | | |
|---|---|---|---|---|
| 4,590,937 | A * | 5/1986 | Deniega | A61L 31/148 606/158 |
| 4,848,112 | A | 7/1989 | Graber et al. | |
| 5,306,283 | A * | 4/1994 | Conners | A61B 17/122 227/902 |
| 5,598,959 | A | 2/1997 | Lorensen et al. | |
| 5,964,440 | A * | 10/1999 | An | F21V 21/08 24/522 |
| 6,202,266 | B1 * | 3/2001 | Van den Branden | A47B 96/06 24/507 |
| 6,234,372 | B1 * | 5/2001 | Rivera | B60R 9/06 224/497 |

(Continued)

FOREIGN PATENT DOCUMENTS

| | | |
|---|---|---|
| DE | 202006017802 U1 | 1/2007 |
| EP | 1142760 A1 | 10/2001 |

(Continued)

*Primary Examiner* — Derek J Battisti
(74) *Attorney, Agent, or Firm* — Sterne, Kessler, Goldstein & Fox P.L.L.C.

(57) ABSTRACT

A jaw member for a support assembly for securing a bicycle to a load carrier for a vehicle. The jaw member includes a frame work structure formed by at least one support element and at least one rib. The frame work structure is adapted to enable the jaw member to withstand a relative high amount of tensile stress while still being relatively light weight.

16 Claims, 12 Drawing Sheets

(56) References Cited

U.S. PATENT DOCUMENTS

| | | | | |
|---|---|---|---|---|
| 6,602,015 | B1* | 8/2003 | Evans | B60R 9/048 224/924 |
| 2003/0089751 | A1* | 5/2003 | Munoz | B60R 9/06 224/492 |
| 2005/0082328 | A1* | 4/2005 | Lo | B60R 9/06 224/499 |
| 2005/0284905 | A1* | 12/2005 | Naslund | B60R 9/048 224/319 |
| 2007/0057001 | A1 | 3/2007 | Wang | |
| 2007/0108245 | A1* | 5/2007 | Ferman | B60R 9/06 224/504 |
| 2010/0288810 | A1* | 11/2010 | Malm | B60R 9/10 224/545 |
| 2011/0068138 | A1* | 3/2011 | Flaherty | B60R 9/06 224/324 |
| 2013/0270412 | A1 | 10/2013 | Bogoslofski et al. | |

FOREIGN PATENT DOCUMENTS

| | | | |
|---|---|---|---|
| EP | 2230412 A1 | 9/2010 | |
| EP | 2746600 A1 | 6/2014 | |
| FR | 3012093 * | 1/2013 | ............... B60R 9/10 |
| WO | WO 2009065817 A1 | 5/2009 | |
| WO | WO 2013004789 A1 | 1/2013 | |

* cited by examiner

CLAMPING JAW FOR A SUPPORT ASSEMBLY FOR A BICYCLE CARRIER

CROSS REFERENCE TO RELATED APPLICATIONS

This application is a continuation of U.S. application Ser. No. 14/915,173, which has a § 371(c) date of Feb. 26, 2016, which is a National Stage entry of WIPO Application No. PCT/EP2014/061487, filed Jun. 3, 2014, which claims priority to EP Application No. 13181828.8, filed Aug. 27, 2013, the disclosures of which are hereby incorporated by reference in their entireties.

TECHNICAL FIELD

A clamping jaw for a support assembly for a bicycle carrier for a vehicle, a knob for transferring torque to the clamping jaw of the support assembly and a support assembly comprising the clamping jaw and the knob.

BACKGROUND

Load carriers for vehicles are widely used to provide the vehicles, such as automobiles, with an increased loading capacity. A load carrier is usually mounted on the vehicles tow hook, an equivalent position at the rear of the vehicle, or on roof racks. Wherever the load carrier is mounted, there is a need to readily secure the bicycle to the load carrier especially before transportation of the bicycle in traffic environments. A bicycle which is accidentally detached from the load carrier during transportation could cause severe damage.

Support assemblies for securing a bicycle to a load carrier for a vehicle are widely used together with load carriers for bicycles. It is common that support assemblies use a clamping jaw to secure the bicycle to the support assembly. One such support assembly is disclosed in the International patent application no. WO 2009/065817 Thule Sweden AB. The clamping jaw of the support assembly comprises a first and a second jaw member which upon tightening with a tightening device, such as a rotating knob, are pressed together about a portion of a bicycle, usually the frame of the bicycle, to secure the bicycle to the load carrier. It is the mouth ribs, i.e. side edges, of the jaw members which engage the bicycle to retain the bicycle to the load carrier.

A clamping jaw of a support assembly can be manufactured in a wide variety of different ways. It has become more common lately to manufacture the clamping jaw from a plastic material e.g. by form molding the two jaw members for example. To provide structural integrity to a jaw member, the jaw member in the WO 2009/065817 document is formed by a frame work structure in terms of that the jaw member comprises a plurality of ribs which project from the outer housing and towards the interior of the jaw member and supportive ribs extending between the side edges of the jaw member. The inside of the "mouth" of the clamping jaw thus has a plurality of exposed ribs. A grip section can be formed at the center section of the jaw member by filling the cavities, or grooves, formed by the frame work structure with a soft thermoplastic polymer. It requires a large amount of thermoplastic polymers to fill the void formed by the frame work structure to provide a reasonable grip section which further adds weight to the clamping jaw.

There is a need for the clamping jaws of the support assemblies and its individual components to withstand a high amount of crash violence. Crash violence is a term for describing the forces imparted to the components during an accident with the vehicle, such as a crash or a collision scenario with another vehicle. During a crash or a collision, the vehicle, the bicycle carrier and of course the support assembly retaining the bicycle to the bicycle carrier is subjected to an extreme amount of crash violence. It has been found that clamping jaws of support assemblies can accidentally break during such high levels of stress, especially when mounted to larger bicycles. In order to overcome this problem clamping jaws are made stronger by increasing the thickness of the material of the clamping jaw. This however makes the clamping jaws bigger and clumsier and more difficult to mount to bicycles as these sometimes tend to have a limited amount of space available for the clamping jaw.

It has been found that during a crash or a collision scenario, at least one of the jaw members of the clamping jaw of a support assembly is especially vulnerable when subjected to high tensile stress. The tensile stress is generally as highest in the mouth of the clamping jaw, i.e. on the bicycle facing side. With reference to a cross section of the jaw member at the center of the mouth, the tensile stress is gradually decreasing closer to the center of gravity of the cross section and will transcend to a compression stress towards the distal end of the structure.

It has now been found that clamping jaws of the aforementioned kind have some disadvantages. If a clamping jaw having a frame work structure needs to be very rigid they tend to become very large and very heavy, and thus not very user friendly nor easy to mount to the bicycle.

The support assembly disclosed in the WO 2009/065817 document comprises a rotatable knob connected to an axle to impart the first and the second jaw members of the clamping jaw with a force to press the jaws together. The axle extends to an opposing end of the support assembly comprising an annular clamp which counteracts the rotating motion of the knob to press the first and the second jaw member together.

There is however always a risk of the user imparts the knob with a too high torque and thus accidentally damages the bicycle. Some support assemblies are thus provided with a torque limiting mechanism to limit the amount of transferrable torque to the clamping jaw via the knob. One such support assembly is disclosed in the European patent application no. EP 2,230,412 A1.

To prevent or significantly reduce the risk of theft of bicycles, support assemblies for load carriers can be provided with locks. The support assembly disclosed in the European patent application no. EP 2,230,412 A1 also comprises a lock mechanism which is cooperating with the torque limiting mechanism to lock or unlock the support assembly. The solution disclosed in the latter document is however associated with a number of drawbacks. The lock mechanism is quite complex due to the configuration of the torque limiting mechanism.

SUMMARY

It is an object of the present disclosure to solve at least one of the aforementioned drawbacks, or to provide for a useful alternative. The object is at least partly met by a jaw member for a support assembly for securing a bicycle to a load carrier for vehicles. The jaw member comprises a frame work structure formed by at least one support element and at least one rib. The support element of the jaw member comprises a bicycle facing side adapted to be positioned adjacent, or substantially adjacent, the bicycle when mounted thereto, and a distal side. The rib extends from the distal side of the support element of the jaw member.

The frame work structure of the jaw member has at least one rib which extends from the distal side of the support element provides for a jaw member which is rigid, i.e. has a high structural integrity and can resist relatively high load of tensile stress, while still being relatively light weighted. It provides a clamping jaw with improved resistance against tensile stress while still having a relatively low weight. In this aspect, the ribs mentioned herein are strengthening ribs. A strengthening rib can have a width/height ratio of at least ⅕, i.e. it is at least five times higher than its thickness, and preferably a length which is at least as long as its height, preferably at least twice as long as the height, more preferably five times the height.

A clamping jaw comprising a first and a second jaw member, the first and/or the second jaw member can have said frame work structure, i.e. the second jaw member can also comprise the frame work structure. The second jaw member can be pivotally attached to the first jaw member, or in the proximity thereof, at a pivot axis to form a clamping jaw.

The rib can extend from the distal side of the support element in a direction substantially perpendicular to the support element. The jaw member becomes extra rigid if the rib extends substantially perpendicular, or perpendicular, out from the distal side of the support element, even if the support element itself has an arc form.

According to an aspect, the frame work structure is positioned at a centre section of the jaw member. Having the frame work at the centre of the jaw member, independently if it is the first or the second, the jaw member is provided with a substantially planar bicycle facing side surface at the centre, i.e. in the mouth. This enables the bicycle facing side to be coated, or provided with a second material, different from which the jaw member or the frame work structure is manufactured from. For example, the frame work structure of the jaw member can be form moulded using a first thermo plastic polymer e.g. polypropylene, and the bicycle facing side of the jaw member can be coated, or provided, with a second thermoplastic polymer such as a softer polyethylene. The support element provides for a flat smooth surface to be coated, which requires little amount of coating material. Hence the bicycle facing side can be provided with a relative soft material, or a friction enhancing material easy and at low cost. The frame work structure can comprise a friction enhancing material defining a grip section.

According to an aspect the first and/or the second jaw member can comprise a first and a second mouth rib. The frame work structure is positioned between the first and the second mouth ribs. Optionally the mouth ribs are separated by a groove on either side of the frame work structure but can be formed integrally therewith. The grooves provide added strength by providing additional ribs to the jaw member.

According to an aspect, the frame work structure comprises two or more ribs, preferably three or more ribs. The two or more ribs are advantageously positioned on either side of a longitudinal centreline of the jaw member and extend along the longitudinal centreline, preferably parallel with the longitudinal centre line.

At least one additional supportive rib can be positioned between two ribs. The at least one supportive rib interconnects the two ribs, or the two or more ribs, and provide additional strength to the jaw member while adding very little weight to the jaw member. A more complex frame work structure is achieved. Instead of having longitudinal groves between the ribs, the jaw member tends to get square like grooves, or triangular formed grooves dependent of the angle between the ribs, and the supportive ribs.

According to an aspect the at least one rib has a base having a width proximal to the support element, and a rim distal to the support element, wherein the width is gradually decreasing towards the rim. The cross section of the rib thus has a slightly tapered form. It has been found that this is important as the weight can be reduced while the structural integrity is still kept high. There are two positive effects, not only is the structural integrity of the jaw member improved but the ribs are also easier to manufactured when form moulding a jaw member using two opposing form moulding tools.

According to an aspect, the support element and the at least one rib are formed in one unitary piece of material, preferably by form moulding.

The jaw member can comprise a second frame work structure at the pivot axis, and the a first frame work structure at the mouth of the clamping jaw. The first frame work structure is as mentioned above, while the second frame work structure can have the ribs projecting from the bicycle facing side of the support element, i.e. the ribs of the support elements projects into the mouth, i.e. from the bicycle facing side of the jaw member and not from the distal side of the support element. This could be advantageous for the configuration of the tensioning device of a support assembly.

According to an aspect, the clamping jaw comprises a first and a second opposing jaw member adapted to be clamped together about a portion of a bicycle, wherein the first jaw member comprises a frame work structure comprising a support element and at least on rib projecting from the support element. The rib of the support element projects from the support element in a direction away from the second jaw member. Optionally the second jaw member comprises a frame work structure comprising a support element and at least on rib projecting from the support element. The rib of the support element projects from the support element in a direction away from the first jaw member.

According to a second aspect, it is an object of the present disclosure to solve at least one of the aforementioned drawbacks, or to provide for a useful alternative. The object is at least partly met by a knob for transferring a torque to an object, such as a support assembly for a bicycle carrier. The knob has a torque limiting mechanism and a lock. The lock can be operated between a locked position in which the knob in unable to transfer torque to the object, and an unlocked position in which the knob is able to transfer torque to the object. The torque limiting mechanism comprises a first and a second gear member, the first gear member is biased into working cooperation with the second gear member wherein upon a torque threshold value, the first and second gear members are disengaged from the working cooperation so that a torque limiting mechanism is provided. The knob has a longitudinal centre axis about which the knob is adapted to rotate to transfer the torque. The first gear member is biased towards the second gear member in a direction along the longitudinal centre axis of the knob into the working cooperation.

The knob provides for a compact knob which is tamper resistant via a lock and still has a good torque limiting mechanism using few components.

According to an aspect, the lock engages the first and/or second gear member directly when being in the unlocked position.

According to an aspect, the lock comprises a lock cylinder; the lock cylinder engages the first and/or the second gear member directly when the lock cylinder is in the unlocked position.

According to an aspect, the first gear member comprises gear teeth adapted to engage the second gear member. The second gear member can comprise corresponding gear teeth. The second gear member can further as an option, comprise lock teeth to engage the lock. The lock teeth advantageously extend around the periphery of the second gear member forming a plurality of positions in which the lock, and especially the lock cylinder, can engage the second gear member directly. Instead of a lock cylinder, which generally tends to work by rotating about its own longitudinal axis, a displaceable lock pin or the like can be used.

According to an aspect, the gear teeth of the first and/or the corresponding gear teeth of the second gear member extends in a direction along the longitudinal centre axis of the knob. As the biasing direction of the first gear member is biased along the longitudinal centre line of the knob, it is very advantageous that the respective gear teeth extend along the longitudinal centre line. They thus have their contact surfaces intersecting with the longitudinal centre line should they be extrapolated.

According to an aspect, the lock teeth of the second gear member extend in a radial direction with respect to the longitudinal centre axis of the knob.

According to an aspect, the present invention relates two a bicycle carrier comprising at least one support assembly comprising at least one clamping jaw and at least one knob for tightening the clamping jaw as disclosed herein.

BRIEF DESCRIPTION OF THE DRAWINGS

Non-limiting embodiments of the present invention will be described in greater detail with reference to the accompanying figures in which.

DETAILED DESCRIPTION OF PREFERRED EMBODIMENTS

Figure 1:
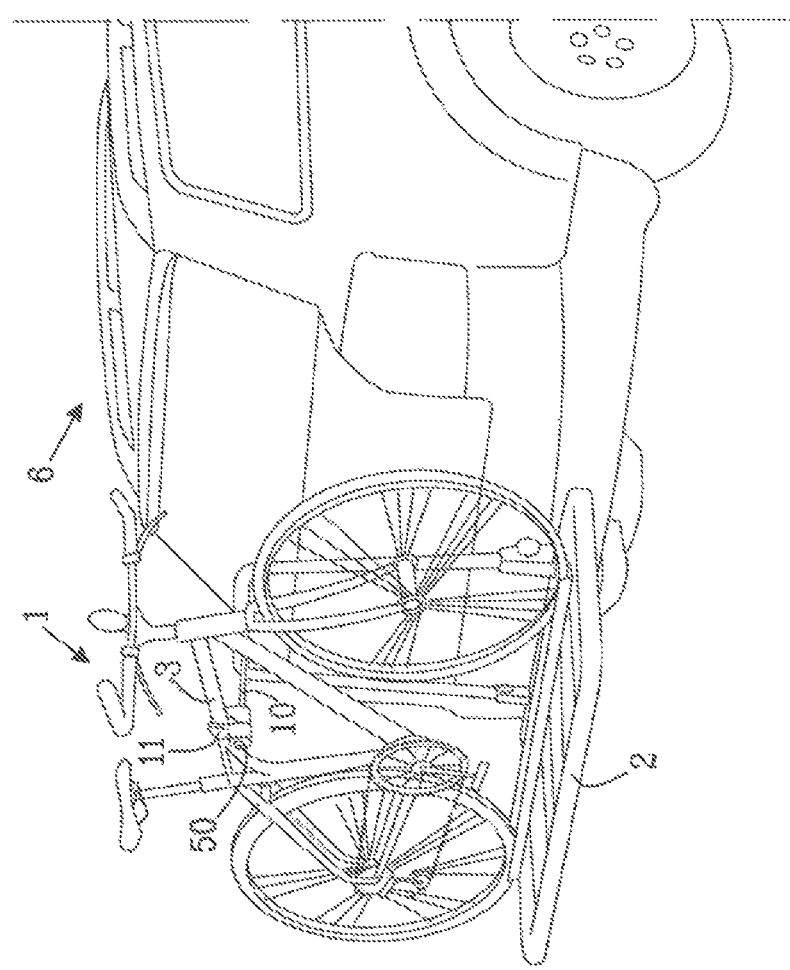
FIG. 1 shows a bicycle mounted on a bicycle carrier on a vehicle and retained by a support assembly having a clamping jaw according to an embodiment of the present invention.

FIG. 1 shows a bicycle 1 having a frame 3 mounted on a bicycle carrier 2 on a vehicle 6. A support assembly 10 retains the bicycle 1 to the bicycle carrier 2 and assists in preventing the bicycle from accidentally detach from the bicycle carrier 2. The bicycle carrier 2 can be provided with one or more support assemblies 10, preferably two or more.

The support assembly 10 comprises a clamping jaw 11 clamping about the frame 3 of the bicycle 2. A tightening device 12 in the form of a rotatable knob 50 is used to tighten or untighten the clamping jaw 11 from the frame 3 of the bicycle 2.

Figure 2:
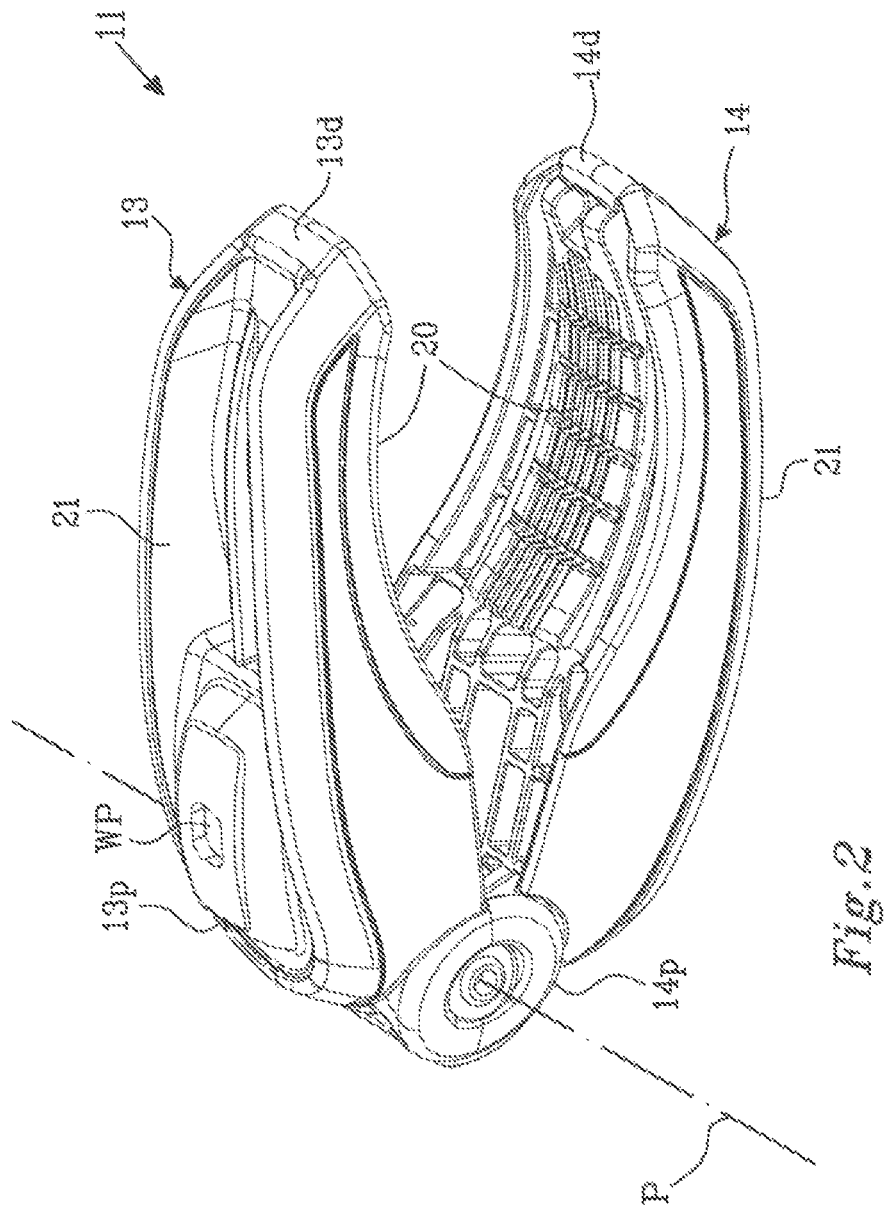
FIG. 2 shows the clamping jaw of FIG. 1 with a view in perspective and in greater detail.

FIG. 2 shows the clamping jaw 11 in greater detail. The clamping jaw 11 comprises a first and a second jaw member 13, 14 which in the shown embodiment are pivotably arranged to each other about a pivot axis P. Each jaw member 13, 14 comprise a proximal end 13p, 14p, and a distal end 13d, 14d, with respect to the pivot axis P. The rotatable knob 50 (not shown in FIG. 2) has a working position WP between the pivot axis P and the distal ends of the first and the second jaw member 13, 14. When the rotatable knob 50 is rotated the jaw members 13, 14 are pivotally displaced together, i.e. pressed together, or pivotally displaced from each other to release the frame 3 of the bicycle 2.

Figure 3:
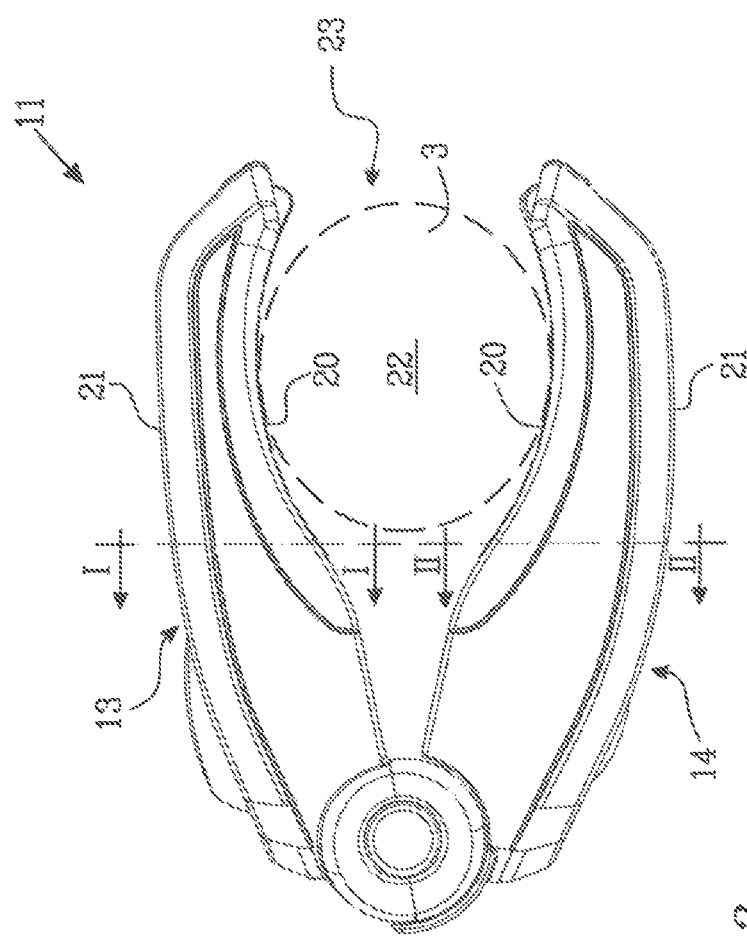
FIG. 3 shows the clamping jaw of FIG. 1 with a view towards the side.

FIG. 3 shows the clamping jaw 11 as seen from the side. The first and the second jaw members 13, 14 comprise a support element 19 (not shown) having a bicycle facing side 20, which also can be referred to as a frame facing side, facing towards the frame 3 of the bicycle 2, and a distal side 21 facing away from the frame 3 and the bicycle 2. The frame 3 is indicated with dashed lines in FIG. 3. The bicycle facing sides 20 of the support elements 19 of the first and the second jaw members 13, 14 define a mouth 22 having a gap 23. The gap 23 is formed by the distal ends 13d, 14d, of the first and the second jaw member 13, 14. As is noticeable, the bicycle facing sides 20 of the first and the second jaw members 13, 14 have an arc shaped form forming a mouth having a substantially oval form when seen from the side as shown in FIG. 3. The oval form of the mouth 22 permits the clamping jaw 11 to readily grasp around the frame 3 of the bicycle 2 and retain the same after the first and the second jaw members 13, 14 are pressed together.

Figure 4:
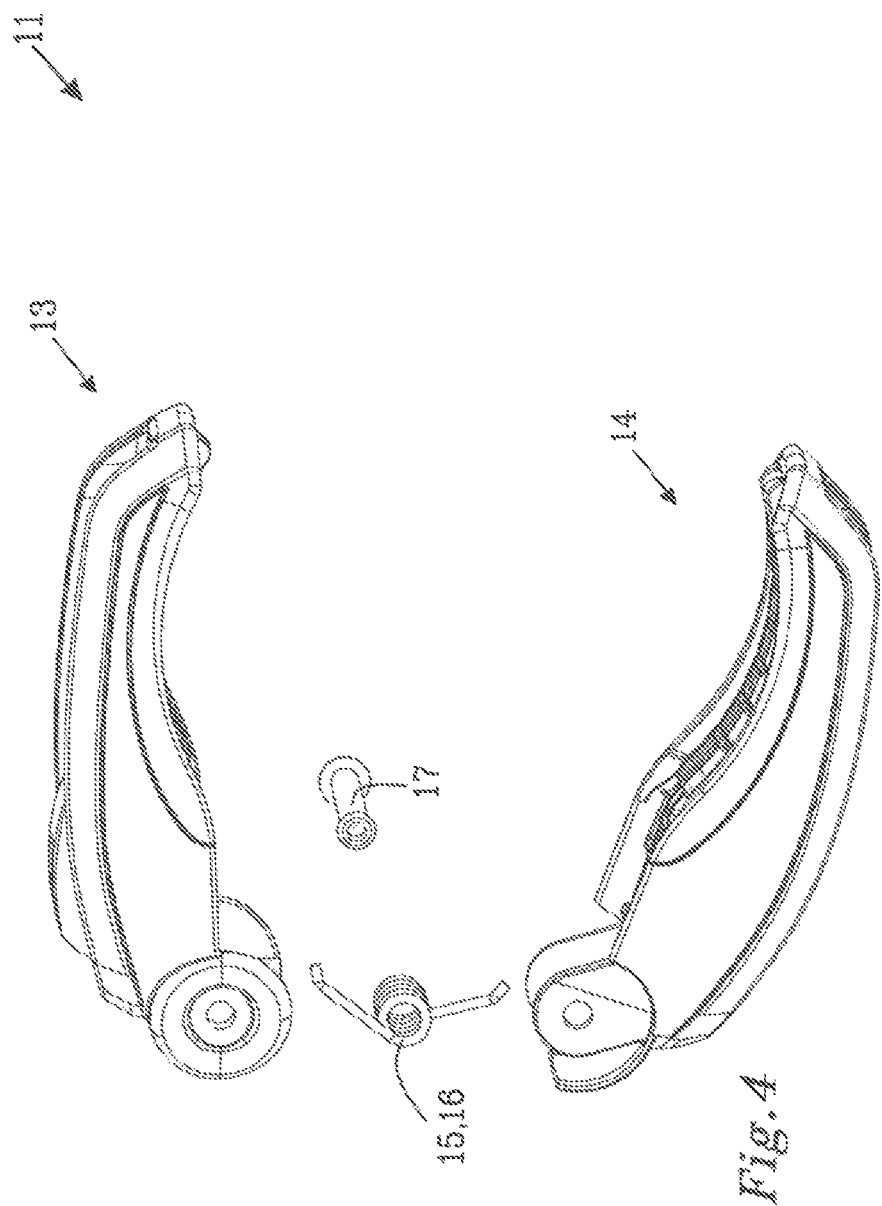
FIG. 4 shows an exploded view of the clamping jaw of FIG. 1.

FIG. 4 shows an exploded view of the clamping jaw 11 of FIG. 2. FIG. 4 shows the first and the second jaw members 13, 14, a biasing member 15 in the form of a spring 16. A bolt 17 connects the first and the second jaw members 13, 14 and extends through the spring 16. The spring 16 biases the first and the second jaw members 13, 14, away from each other, so that when the knob 50 is rotated to untighten the clamping jaw 11, the first and the second jaw members 13, 14 are biased away from each other.

Figure 5:
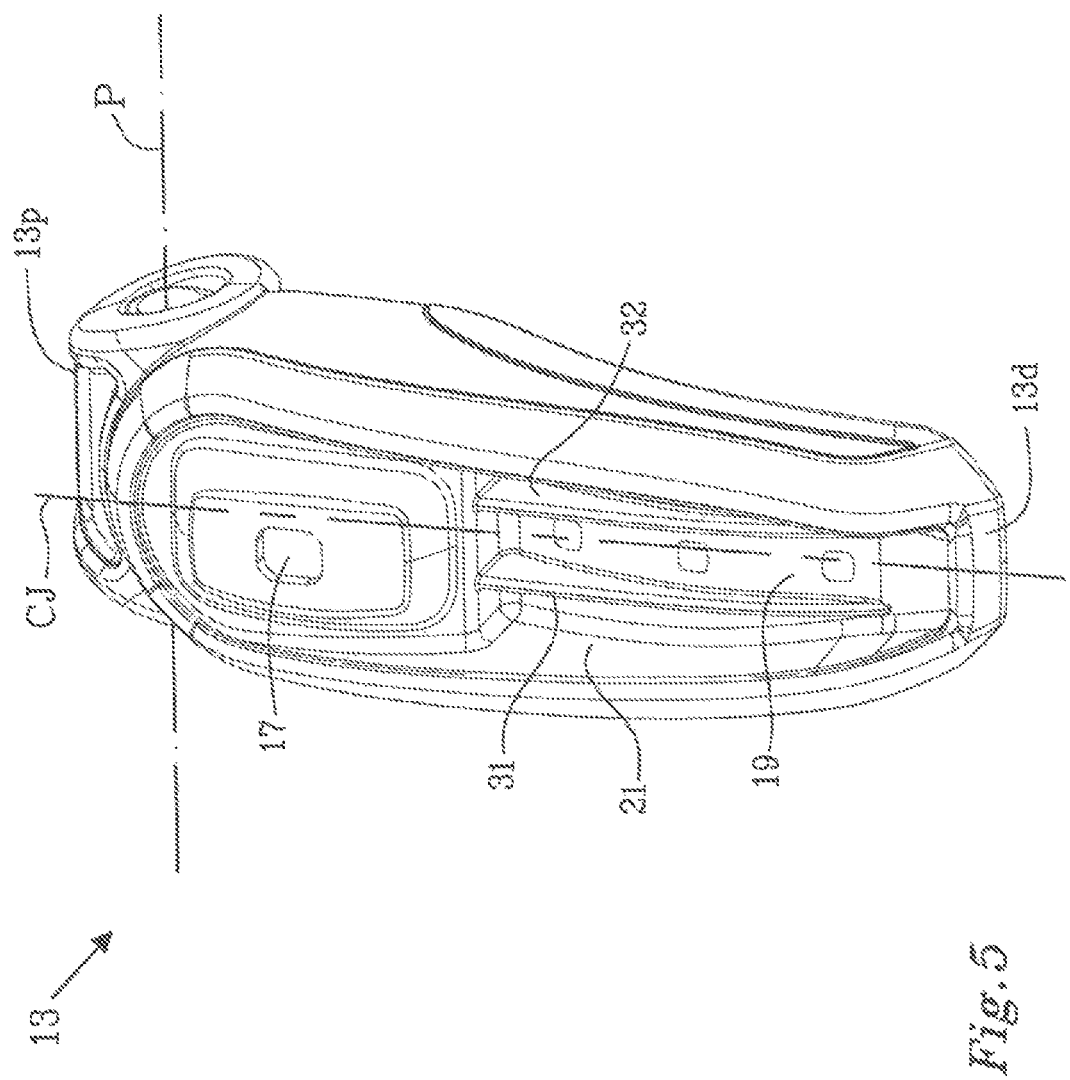
FIG. 5 shows the first jaw member of the clamping jaw of FIG. 1.

FIG. 5 shows a perspective view of the first jaw member 13 in greater detail and with a view towards the upper side of the first jaw member 13, referred to as the distal side 21 of the support element 10 of the first jaw member 13. FIG. 5 further shows the proximal end 13p and the distal end 13d of the jaw member 13, and the pivot axis P. An aperture 17 extends through the first jaw member 13 and permits an axle (not shown) of the tightening device 12 to extend through the first jaw member 13 as will be explained below in greater detail. Such mentioned axle would be connected to the knob 50 in the present case. A longitudinal centerline CJ extends along the first jaw member 13.

A first and a second rib 31, 32 extend along the longitudinal centerline CJ. The purpose of these ribs 31, 32 will be explained with reference to FIG. 6.

Figure 6:
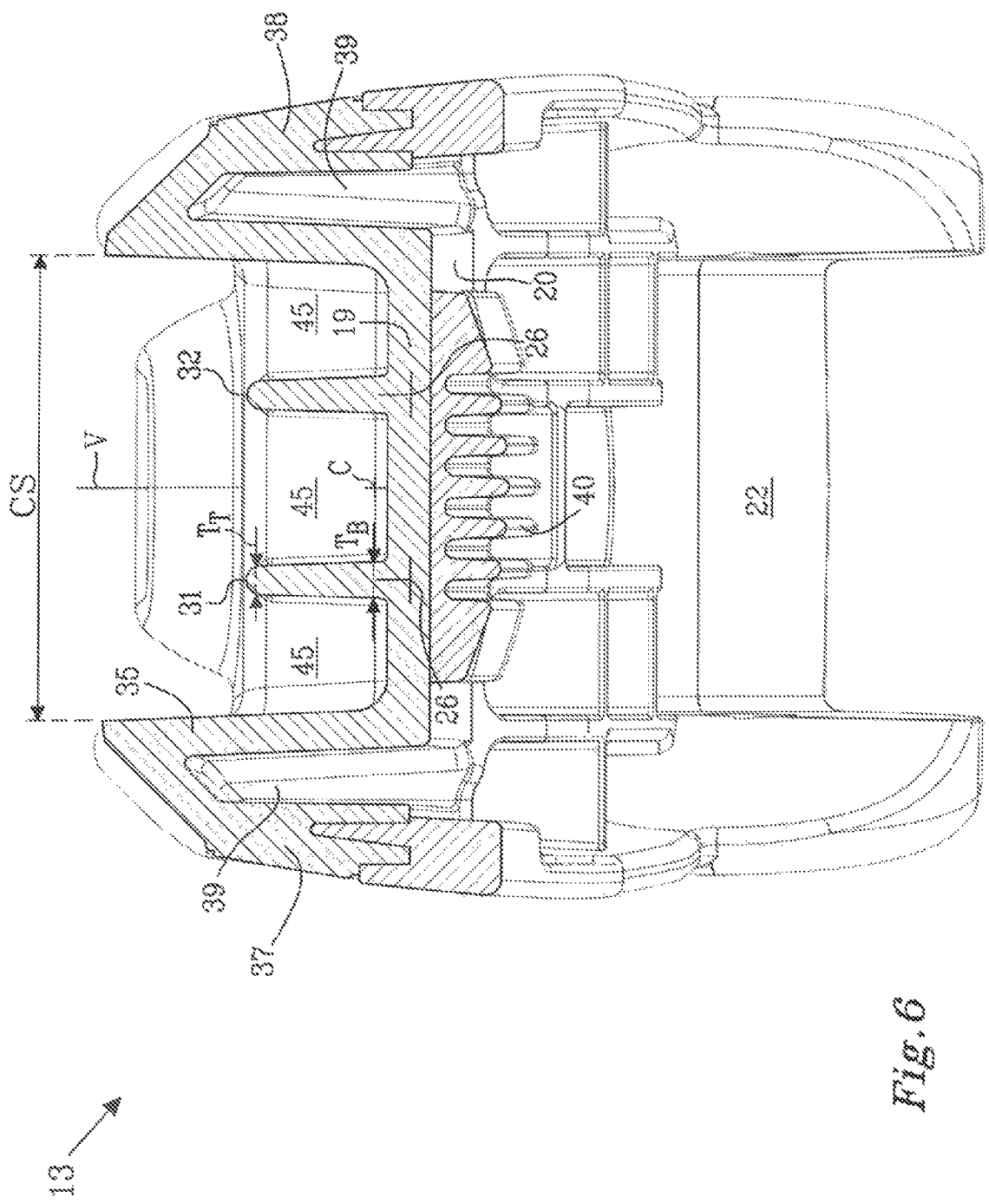
FIG. 6 shows a cross section of the first jaw member of FIG. 5.

FIG. 6 is a cross section of FIG. 3 along the lines I-I. FIG. 6 shows a cross section of the first jaw member 13, the support element 19 having the bicycle facing side 20 and the distal side 21, the mouth 22, and the first and the second ribs 31, 32. For the purpose of orientation, the longitudinal centerline CJ and a vertical axis V divides the first jaw member into a left and a right section.

The bicycle facing side 20 of the support element 19 has a planar surface and a first and a second rib 31, 32 which extends form the distal side 21 of the support element 19 of the first jaw member 13. The first jaw member 13 thus comprises a center section CS which extends along the longitudinal centerline CJ and with respect to the cross section, has an extension perpendicular to the longitudinal centerline CJ. The center section CS if formed by a portion of the first jaw member 13, in this case the support element 19. The bicycle facing side 20 of the support element 19 has as mentioned above a slightly arc shaped form along the longitudinal center line, but a smooth planar surface, in contrast to the distal side 21 of the support element 19 of the first jaw member 13 which has the first and the second rib 31, 32 extending from the distal side 21. It is of course possible that the bicycle facing side can have a flat planar surface, a slightly concave or convex surface, nevertheless it has no protruding ribs from the bicycle facing side, in contrast to the distal side of the support element 19.

This makes the bicycle facing side 20 of the support element 19 suitable for being provided with a second material, such as a friction enhancing material. With the planar surface of the support element forming the bicycle facing side, low amounts of friction enhancing material can be used.

The cross section of the first jaw member 13 when viewed as shown in FIG. 6 could be described as having raised walls extending from the distal end 21 of the support element 19 extending in a direction away from the bicycle facing side 20 of the support element 19. A third and a forth rib 35, 36 form a first and a second side rib 35, 36. The ribs 31, 32, 35, 36 together define three grooves 45 formed between the ribs 31, 32, 35, 36. Having grooves 45 reduces the overall weight of the first jaw member 13. The first and the second side ribs 35, 36 diverges back towards the bicycle facing side 20 and defines a first and a second mouth rib 37, 38 of the mouth 22 of the first jaw member 13. A groove 39 separates the first and the second side rib 35, 36 from the first and the second mouth rib 37, 38.

The cross section of the first and the second ribs 31, 32 have a thicker base as compared to the thickness at the top. In FIG. 6, the thickness of the base is indicated as TB and the thickness at the top, just before the top transcends to a smooth apex, is indicated with TT. The ribs 31, 32 are thus tapered in their cross section. At least one jaw member having at least one rib, preferably one rib arranged on either side of the centerline, having a tapering cross section, has been found to be very advantageous.

As mentioned, the first and the second ribs 31, 32 extend substantially parallel with the longitudinal centerline CJ. As is also noticeable, the distal side 21 of the support element 19 is not covered, e.g. by a lid or similar. The upper side of the first jaw member 13 thus has grooves or channels, which reduces the overall weight of the first jaw member 13 while still providing a good structural strength to the first jaw member 13.

Figure 7:
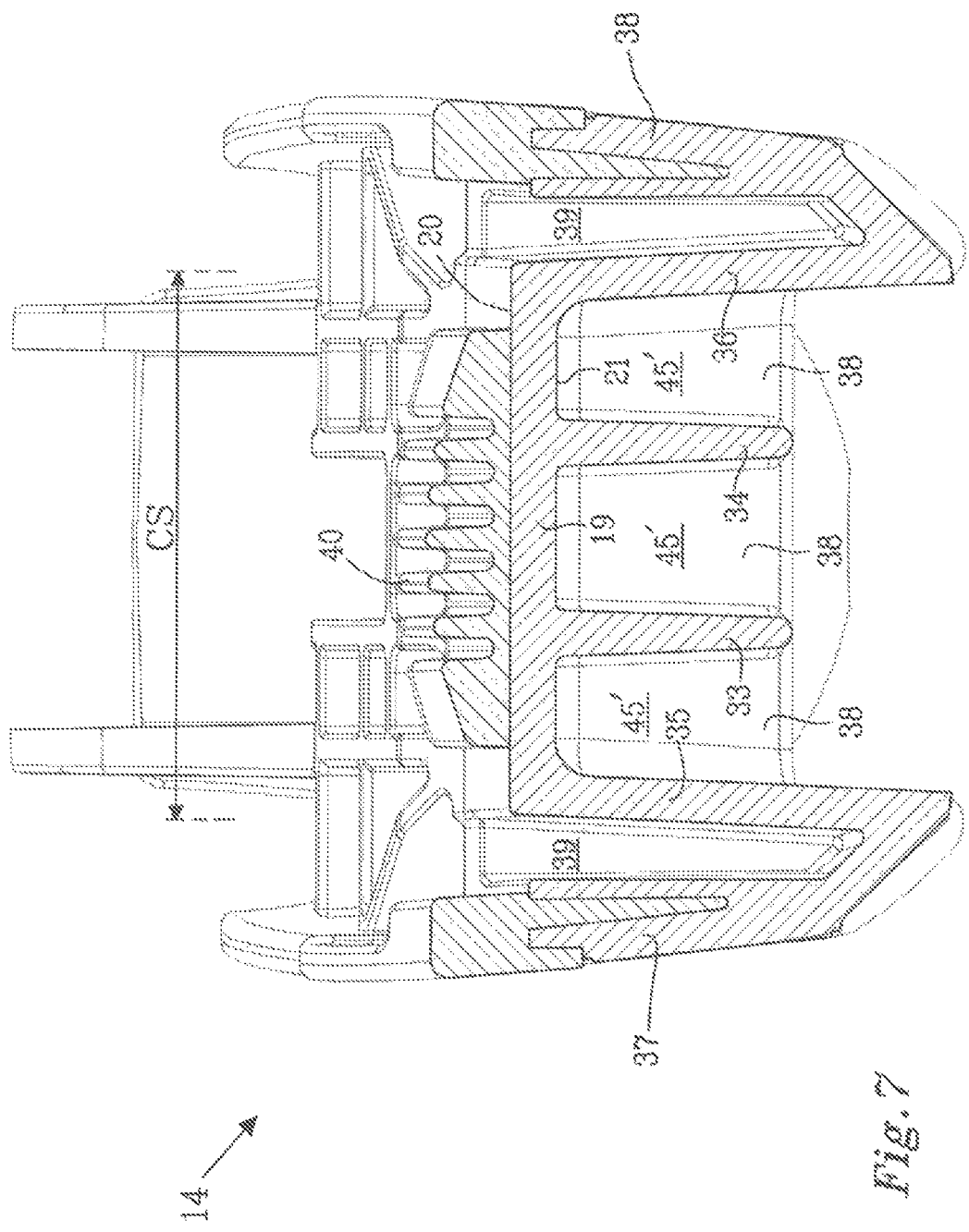
FIG. 7 shows a cross section of the second jaw member of FIG. 1.

FIG. 7 shows the cross section of the second jaw member 14 along the line II-II as seen in FIG. 2. The frame work structure of the second jaw member 14 will be described in greater detail below. As is noticed in FIG. 7, the second jaw member 14 has a support element 19' having a bicycle facing side 20. The second jaw member 14 further comprises a center section CS which extends along the longitudinal centerline CJ. The support element 19' has a planar surface at the center section CS, and a first and a second rib 33, 34 which extends from the distal side 21 of the support element 19'. The bicycle facing side 20 of the support element 19' has as mentioned above an arc shaped form, but a smooth planar surface, in contrast to the distal side 21 of the of the support element 19' which comprises the first and the second rib 33, 34 extending from the distal side 21 and away from the bicycle facing side 20 of the support element 19'.

A third and a forth rib 35, 36 form a first and a second side rib 35, 36 extending substantially parallel with the first and the second ribs 33, 34. The first and the second side ribs 35, 36 diverges back towards the bicycle facing side 20 and define a first and a second side mouth rib 37, 38 of the mouth 22 of the second jaw member 14. A groove 39 separates the first and the second side rib 35, 36 from the first and the second mouth rib 37, 38.

The second jaw member 14 also has support ribs 38 extending between the ribs 33, 34, 35, 36 interconnecting the ribs 33, 34, 35, 36 to further improve the structural integrity of the second jaw member 14. The support ribs 38 have the same height as the first and the second rib 33, 34. The support ribs 38 form a plurality of square like grooves 45' together with the ribs 33, 34, 35, 36. Having longitudinal grooves 45' reduces the overall weight of the second jaw member 14 while still providing a relatively high structural strength to the second jaw member 14.

The first and the second jaw member 13, 14 will be described in further with reference to FIG. 8, which shows a schematic cross section of the second jaw member 14 shown in FIG. 7. It should be noted however that the cross section of the second jaw member 14 is in principle the same as the cross section of the first jaw member 13, shown in FIG. 6.

Figure 8:
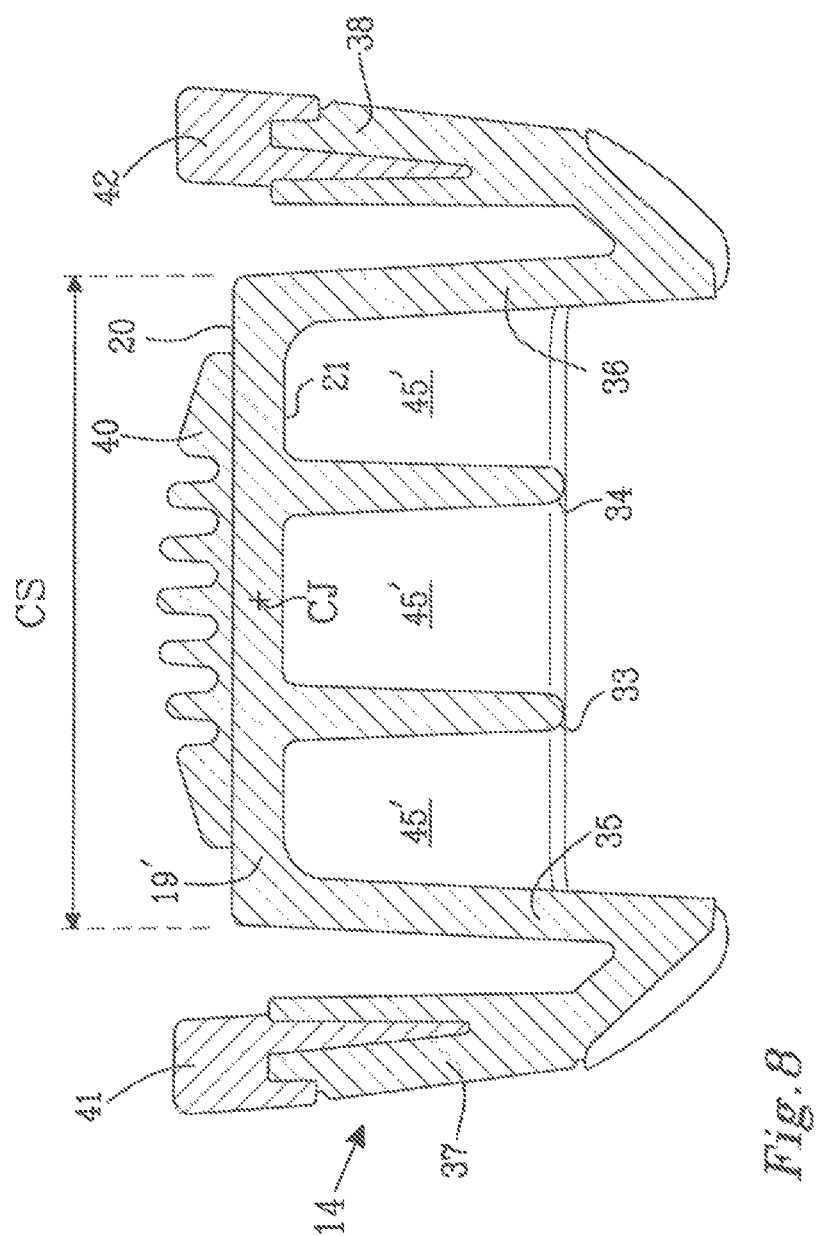
FIG. 8 shows a schematic cross section of the cross section shown in FIG. 6.

FIG. 8 shows the jaw member 14 having a support element 19' comprising a continuous planar center section CS having a bicycle facing side 20 and a distal side 21. The support element 19' comprises four ribs 33, 34, 35, 36 extending from the distal side 21 of the support element 19' and substantially perpendicular from the support element 19'. A first and a second rib 33, 34 is positioned on either side of the longitudinal centerline CJ, a first and second side rib 35, 36 is positioned on either side of the first and the second rib 33, 34 forming three grooves 45' between the ribs 33, 34, 35, 36. The first and the second side ribs 35, 36 diverges back towards the bicycle facing side 20 of the support element 19' forming the first and the second side mouth rib 37, 38.

Having a continuous planar bicycle facing side 20 on the support element 19', and especially in the center section CS, will make the second jaw member 14 more resistant against tensile stress as the second jaw member 14 will have plenty of material withstanding the tensile stress at the bicycle facing side 20. The center of gravity of the cross section, as seen in FIGS. 8-9c is relatively close towards the bicycle facing side 20 of the support element 19' which further indicates that the transition from tensile stress to compression stress is closer to the support element and thus the bicycle facing side 20, it would also indicate that the tensile stress is lower than the compression stress, which is very positive with respect to the structural strength of the second jaw member 14. The same reasoning applies to the first jaw member 13 of course.

As can be seen in FIG. 8, the bicycle facing side 20 of the support element 19', in this case on the second jaw member 14, comprises a grip section 40. The grip section is positioned on the center section CS of the second jaw member 14 and is formed by a relatively soft thermoplastic material such as polyethylene or a mixture of polyethylene and polypropylene. The purpose of the grip section 40 is to improve the grip between the clamping jaw and the frame of the bicycle.

The grip is improved by providing an improved friction between the frame of the bicycle and the clamping jaw, and by providing an increased grip area. As used herein, the term grip area is intended to mean the actual surface area which is in contact with the frame of the bicycle after the clamping jaw has been mounted to the bicycle and tightened in an appropriate manner permitting transportation of the bicycle on public roads and in a normal traffic situation.

As is also noticeable is that the first and the second side mouth ribs 37, 38 comprises grip sections 41, 42

Figure 9A:
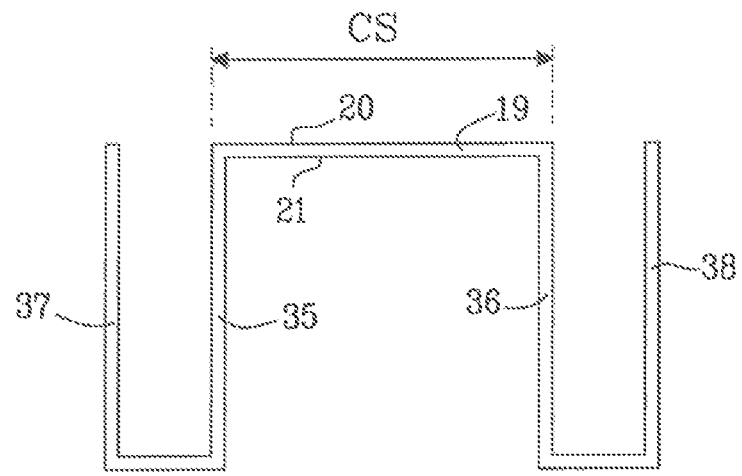
FIGS. 9a-9c show schematic cross sections of different jaw members.
Figure 9B:
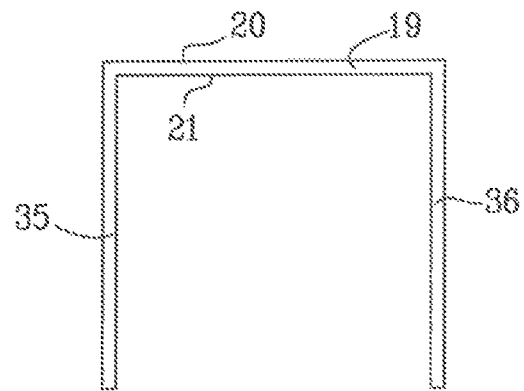
Figure 9C:
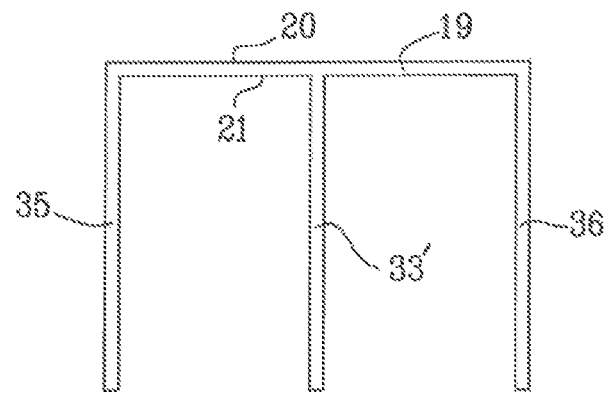

With reference to FIGS. 9a-9c, different schematic center sections will be briefly described. FIG. 9a shows a cross section of a jaw member having a support element 19 with a bicycle facing side 20 and a distal side 21. A first and a second side rib 35, 36 extending substantially perpendicularly from the distal side 21 of the support element 19 and which diverges back towards the bicycle facing side 20 of the support element 19 forming a first and a second side mouth rib 37, 38.

The jaw member of FIG. 9b has only a first and a second side rib 35, 36 which extends substantially perpendicular from the distal side 21 of the support element 19 of the jaw member. The jaw member of FIG. 9b does not have any side mouth ribs, the form and extension of the support element 19 thus defines the sides of the mouth of the clamping jaw. The jaw member of FIG. 9c is similar to the jaw member of FIG. 9b with the difference that it comprises an additional rib 33' extending from distal side 21 of the support element 19 and which is centrally positioned between the first and the second side ribs 35, 36.

The bicycle facing side 20 is as mentioned planar. According to an aspect, the bicycle facing side 20, at least in the central section CS, has a continuous planar surface area of about at least 2 cm$^2$, preferably at least 3 cm$^2$, more preferably 4-20 cm$^2$. A continuous planar surface area on the bicycle facing side will not only permit the formation of a grip section 40, but also improve the structural properties of the jaw member. The planar surface can be flat, concave or convex, while still being planar.

As mentioned above with reference to the first and the second jaw member 13, 14, the grooves 45 can be longitudinal channel like grooves if the ribs are not interconnected with support ribs. If support ribs are present, the grooves 45, 45' can be square like grooves or triangular formed grooves for example. Mixtures of grooves having different forms are of course possible.

The distinct configuration of the first jaw member 13, and the second jaw member 14 is configured similarly or identical, provides a clamping jaw 11 which has a low weight and a high structural integrity, i.e. strength. As mentioned, it has been found that clamping jaws of support assemblies for bicycle carriers are known to break when being exposed to too high tensile stress, i.e. due to a low tolerance against tensile stress. The clamping jaw described herein has a low weight while still being resistant to a relatively high tensile stress subjected to the jaw member at the bicycle facing side of the support element.

The first jaw member 13 and optionally the second jaw member 14 are form moulded using a two component technique and using a hard plastic material and a softer plastic material. The first and the second jaw members 13, 14 can be similarly formed and configured but it is also possible that the first jaw member is different from the second jaw member, the first jaw member could be form moulded and the second jaw member could be formed by stainless steel for example. In the shown embodiment in FIG. 4, both the first and the second jaw members 13, 14 are manufactured using a form molding technique.

Figure 10:
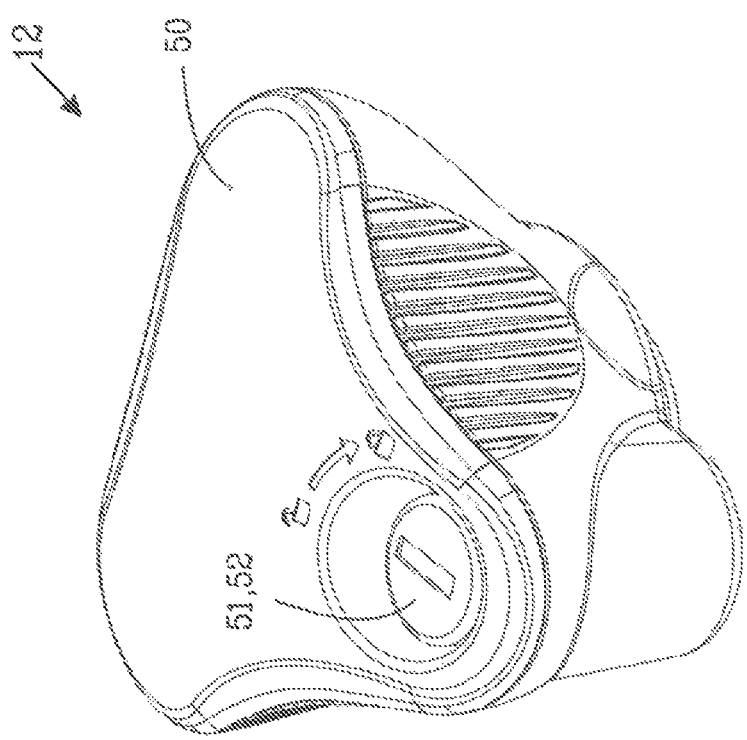
FIG. 10 shows the knob of the support assembly of FIG. 1.

FIG. 10 shows the tightening device 12 in the form of the rotatable knob 50 in greater detail. The knob 50 is used to press the first and the second jaw members together (not shown in FIG. 10). When the knob 50 is rotated, or turned, the first and the second jaw members are either pressed together or displaced from each other upon which a clamping force will be reduced. The knob 50 is provided with a lock 51, in this case a lock cylinder 51 adapted to receive a key (not shown) for operating the lock cylinder 52. The lock 51 is configured to either prevent the knob 50 from being able to displace the first and the second jaw members from each other or to permit the first and the second jaw members to be pressed against each other, in a manner which will be described in greater detail herein.

Figure 11A:
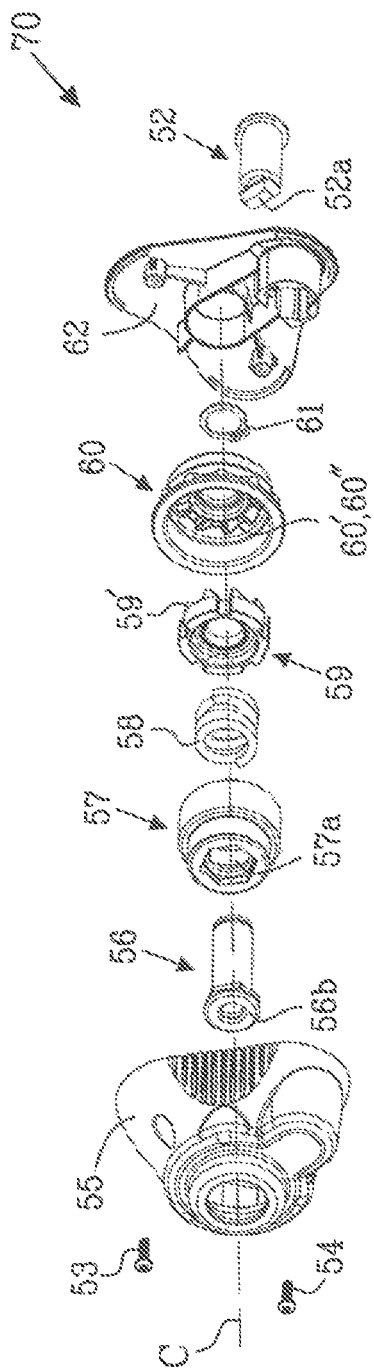
FIGS. 11a-11b show an exploded view of the knob of FIG. 10 in different perspective views.
Figure 11B:
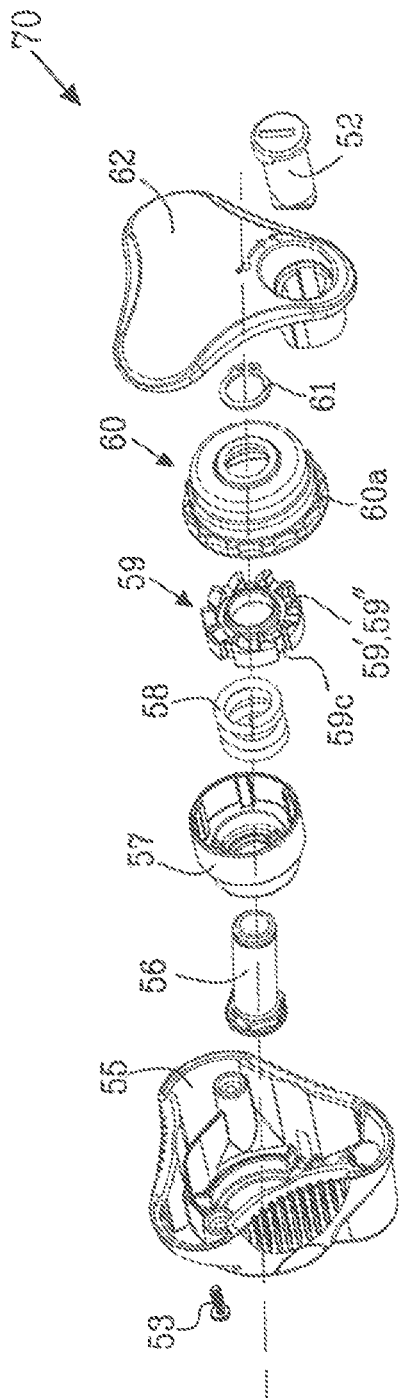

The individual components of the knob 50 will be described in greater detail with reference to FIGS. 11a-11b simultaneously. FIGS. 11a-11b show the knob 50 having a longitudinal center axis C in exploded view and with a perspective view. From the left, FIGS. 11a-11b show a first and a second housing screw 53, 54, a housing 55, an axle receiving member 56, an interior housing 57, a spring 58, a first gear member 59, a second gear member 60, a lock washer 61, a lid 62 and the lock cylinder 52 having a lock bolt 52a, in this case a rotatable lock bolt.

An axle, such as a screw or bolt cooperating with the opposite end of the support assembly is connected to the axle receiving member to form the tightening device 12. Such connection and function is known per se and will not be described further herein.

The knob 50 comprises a torque limiting mechanism 70, the torque limiting mechanism 70 is adapted to prevent a user from imparting too much torque to the axle receiving member 53, and thus from pressing the first and the second jaw members (not shown) together too hard.

The torque limiting mechanism 70 is operating through the interaction between the first and the second gear members 59, 60 as will be described herein. As can be noted, the first gear member 59 comprises gear teeth 59' extending along the longitudinal center axis C and having an angled surface 59" on each of the gear teeth 59'. The first gear member 59 is adapted to be in working cooperation with the second gear member 60. The second gear member 60 also comprises gear teeth 60' extending along the longitudinal center axis C and having an angled surface 60" on each of the gear teeth 60'. The gear teeth 59' of the first gear member 59 are adapted to interact with the gear teeth 60' of the second gear member 60 so as to transfer torque imparted by a user there between, however, as a threshold level of torque is reached the gear teeth 59', 60' will start to slip and eventually loose grip with each other. As the grip between the first and the second gear member 59', 60' is lost the first gear member 59 will rotate with respect to the second gear member 60 and thus prevent the rotating motion imparted by the user from being transferred between the first and the second gear members 59, 60.

A biasing member, in the form the spring 58, in this case a helical spring, biases the first and the second gear members 59, 60 together. The spring 58 is configured to bias the first gear member 59 in a direction along the longitudinal center axis C towards the second gear member in into working cooperation with the second gear member 60.

The spring 58 and the first gear member 59 are positioned inside of the interior housing 57. The interior housing 57 comprises an aperture 57a through which the axle receiving member 56 extends. The axle receiving member 56 and the interior housing 57 are further prevented from rotation with respect to each other via a polygonal connection 56b, 57b, in this case a hexagonal connection on the axle receiving member 56 and the interior housing 57. The first gear member 59 can be displaced inside of the interior housing 57 and while being guided along tracks 57c on the interior surface of the interior housing 57. The tracks 57c of the interior housing 57 prevents the first gear member 59 from rotation with respect to the interior housing 57 while permitting the first gear member 59 to be displaced along the longitudinal center line C of the knob 50. Corresponding guiding tracks 59 are arranged on the first gear member 59.

The second gear member 60 comprises an aperture through which the axle receiving member 56 extends. The lock washer 61 is positioned around the axle receiving member 56 at the end thereof to connect the second gear member 60 to the axle receiving member 56.

The lock cylinder 52, which is accessible from the outside of the lid 62, is configured to cooperate directly with the second gear member 60. The lock mechanism of the knob 50 is thus configured to operate directly on one of the gear members 59, 60, in this case the second gear member 60, to provide for the locking function.

As is noticeable, the second gear member 60 comprises lock teeth 60a which extends in a direction substantially perpendicular to the longitudinal center axis C and are thus adapted to operate in a radial direction thereof. The lock teeth 60a has a form which is adapted to cooperate with a lock bolt 52a of the lock cylinder 52.

The housing 55 and the lid 62 can rotate freely with respect to the axle receiving member 56, the interior housing 57, the first gear member 59 and the second gear member 60 when the lock cylinder 52 is not engaging the second gear member 60. The knob 50 is thus tamper proof and cannot be used to press first and the second jaw members together. When the lock bolt 52a is rotated into engagement with the lock teeth 60a of the second gear member 60, the lid 62 and the housing 55 are engaged with the torque limiting mechanism 70 and thus can be used to tighten or releasing the first and the second jaw members. A simple and useful theft protection function is incorporated into the knob 50 which uses relatively few components.

Figure 12:
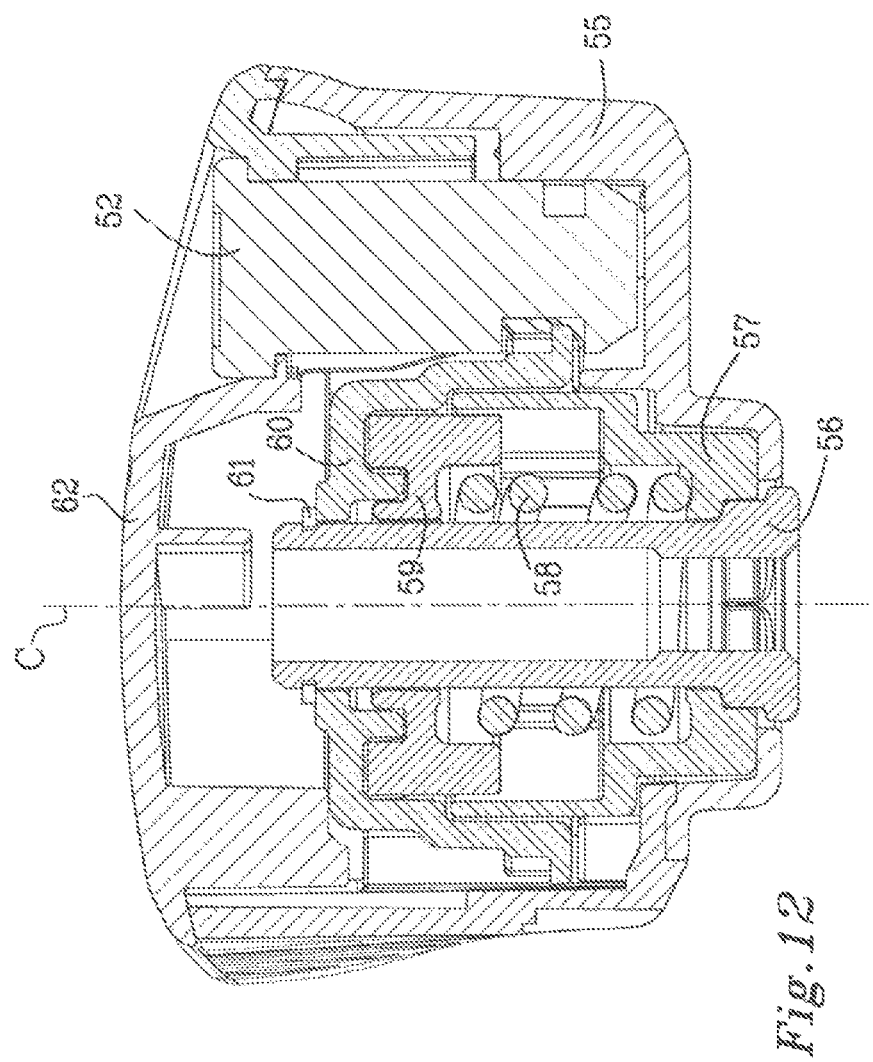
FIG. 12 show a cross section of the knob shown in FIG. 10.

FIG. 12 shows a cross section of the knob 50 with the longitudinal center axis C. FIG. 12 shows the housing 55 connected to the lid 62 via the first and the second housing screws 53, 54 (not shown in FIG. 12). The axle receiving member 56, enveloped by the interior housing 57. The spring 58 is threaded onto the axle receiving member 56 and biasing the first gear member 59 into engagement with the second gear member 60. The lock cylinder 52 is directly engaging the second gear member 60 while being accessible from the outside via the lid 62.

In general terms, the clamping jaw can comprise a first and a second opposing jaw member adapted to be clamped together about a portion of a bicycle, wherein the first jaw member comprises a frame work structure comprising a support element and at least on rib projecting from the support element. The rib of the support element projects from the support element in a direction away from the second jaw member. Optionally the second jaw member comprises a frame work structure comprising a support element and at least on rib projecting from the support element. The rib of the support element projects from the support element in a direction away from the first jaw member.

The support element provides the jaw members(s) and the clamping jaw with a planar, or flat, surface towards the bicycle while the supporting ribs project away from the planar, or flat, bicycle facing surface.

What is claimed is:

1. A clamping jaw for a support assembly for securing a bicycle to a load carrier for a vehicle, said clamping jaw comprising:
   a first jaw member comprising:
      a first frame work structure formed by a first support element and a first plurality of ribs, wherein said first support element of said first jaw member comprises:
         a bicycle facing side configured to be positioned substantially adjacent said bicycle when mounted thereto, and
         a distal side, opposite the bicycle facing side, wherein each of said first plurality of ribs extends from said distal side and away from said bicycle facing side of said first support element of said first jaw member, and wherein a first pair of ribs of said first plurality of ribs are separated from each other by a first groove,
      wherein at least one of said first plurality of ribs comprises a base having a thickness proximal to said first support element, and a top surface distal to said first support element,
   wherein said thickness gradually decreases from said base to said top surface; and
   a second jaw member coupled to the first jaw member to form the clamping jaw, the second jaw member comprising:
      a second frame work structure formed by a second support element and a second plurality of ribs, wherein said second support element of said second jaw member comprises:
         a bicycle facing side configured to be positioned substantially adjacent said bicycle when mounted thereto, and
         a distal side, opposite the bicycle facing side, wherein each of said second plurality of ribs extends from said distal side and away from said bicycle facing side of said second support element of said second jaw member, and wherein a second pair of ribs of said second plurality of ribs are separated from each other by a second groove.

2. The clamping jaw according to claim 1, wherein:
   each of said first plurality of ribs extends from said distal side of said first support element in a direction substantially perpendicular to said first support element; and
   each of said second plurality of ribs extends from said distal side of said second support element in a direction substantially perpendicular to said second support element.

3. The clamping jaw according to claim 1, wherein said first frame work structure is positioned at a center section of said first jaw member.

4. The clamping jaw according to claim 3, wherein said first jaw member comprises a first and a second mouth rib, and wherein said first frame work structure is positioned between said first and said second mouth rib and separated by a groove on either side of said first frame work structure.

5. The clamping jaw according to claim 3, wherein said first jaw member comprises three grip sections, wherein said first frame work structure and said first support element forms, or supports, a center grip section between two grip sections.

6. The clamping jaw according to claim 1, wherein said first support element and said first plurality of ribs are formed in one unitary piece of material.

7. The clamping jaw according to claim 1, wherein said bicycle facing side of said first support element comprises a friction enhancing material defining a grip section.

8. The clamping jaw according to claim 1, wherein said first jaw member is coupled to said second jaw member at a pivot axis, and said first frame work structure is disposed at a mouth of said clamping jaw.

9. The clamping jaw according to claim 1, wherein said first plurality of ribs is disposed between said distal side and an outer distal most surface of said first support element.

10. A jaw member for a support assembly for securing a bicycle to a load carrier for a vehicle, said jaw member comprising:
a frame work structure formed by at least one support element and at least one rib, wherein said support element of said jaw member comprises:
a bicycle facing side adapted to grip said bicycle when mounted thereto; and
a distal side facing away from the bicycle facing side, wherein said at least one rib extends from said distal side of said support element of said jaw member; and
first and second mouth ribs coupled to said frame work structure,
wherein said frame work structure is positioned between said first and second mouth ribs and separated by a groove on either side of said frame work structure,
wherein said groove laterally spaces said frame work structure from said respective first and second mouth ribs,
wherein said groove is disposed within said jaw member and extends away from said bicycle facing side and toward said distal side, and
wherein the at least one rib comprises a base having a thickness proximal to said support element, and a top surface distal to said support element, wherein said thickness gradually decreases from said base to said top surface.

11. The jaw member according to claim 10, wherein said at least one rib is disposed between said distal side and an outer distal most surface of said first and second mouth ribs.

12. The jaw member according to claim 11, wherein said at least one rib comprises a plurality of ribs.

13. A jaw member for a support assembly for securing a bicycle to a load carrier for a vehicle, said jaw member comprising:
a frame work structure formed by at least one support element and at least one rib,
wherein said support element of said jaw member comprises:
a bicycle facing side adapted to be positioned substantially adjacent said bicycle when mounted thereto and
a distal side, wherein said at least one rib extends from said distal side of said support element of said jaw member,
wherein said at least one rib comprises a base having a thickness proximal to said support element, and a top surface distal to said support element, wherein said thickness gradually decreases from said base to said top surface.

14. A support assembly for securing a bicycle to a load carrier for a vehicle, the support assembly comprising:
a clamping jaw for clamping a frame of the bicycle; and
a tensioning device comprising a rotatable knob configured to tighten or untighten the clamping jaw, wherein the clamping jaw comprises:
a first jaw member; and
a second jaw member opposite the first jaw member, wherein the first jaw member comprises:
a frame work structure formed by at least one support element and at least one rib; and
an aperture which extends through the first jaw member and permits an axle connected to the rotatable knob to extend through the first jaw member,
wherein the at least one rib projects from the support element in a direction away from the second jaw member, and
wherein the at least one rib comprises a base proximal to the support element, and a top surface distal to the support element, wherein a thickness of the at least one rib gradually decreases from the base towards the top surface.

15. The jaw member according to claim 10, wherein said frame work structure comprises first and second side ribs disposed on either side of said support element and extending toward said distal side, wherein said first and second side ribs are separated from said respective first and second mouth ribs by said groove.

16. The support assembly according to claim 14, wherein said at least one rib comprises a plurality of ribs.

* * * * *